(12) United States Patent
Tozuka et al.

(10) Patent No.: US 7,402,767 B2
(45) Date of Patent: Jul. 22, 2008

(54) HANDLE SWITCH DEVICE OF VEHICLE

(75) Inventors: Tsutomu Tozuka, Saitama (JP); Takashi Nakamura, Saitama (JP); Hirokazu Nakata, Saitama (JP); Koichi Hikichi, Saitama (JP); Shigeru Kodaira, Saitama (JP); Masaru Nakayama, Saitama (JP)

(73) Assignees: Toyo Denso Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/730,576

(22) Filed: Apr. 2, 2007

(65) Prior Publication Data

US 2007/0235315 A1 Oct. 11, 2007

(30) Foreign Application Priority Data

Apr. 3, 2006 (JP) ............................ 2006-101528

(51) Int. Cl.
  *H01H 15/00* (2006.01)
(52) U.S. Cl. ..................... 200/61.54; 200/561
(58) Field of Classification Search ............... 200/17 R, 200/18, 61.27, 61.54, 61.57, 61.85, 61.87, 200/61.88, 329, 339, 553, 558, 559, 561–563
  See application file for complete search history.

(56) References Cited

U.S. PATENT DOCUMENTS

| | | | | | |
|---|---|---|---|---|---|
| 4,169,972 A | * | 10/1979 | Black et al. | ............. | 200/557 |
| 4,191,866 A | * | 3/1980 | Nakajima et al. | ............. | 200/4 |
| 4,361,739 A | * | 11/1982 | Harata et al. | ............. | 200/16 C |
| 4,659,880 A | * | 4/1987 | Kondo et al. | ............. | 200/5 R |
| 4,710,599 A | * | 12/1987 | Motodate et al. | ......... | 200/61.85 |
| 4,847,454 A | * | 7/1989 | Hiruma | ............. | 200/61.85 |
| 5,285,039 A | * | 2/1994 | Satoh | ............. | 200/563 |
| 5,519,378 A | * | 5/1996 | Queensbury | ............. | 340/475 |
| 5,555,973 A | * | 9/1996 | Horisawa | ............. | 200/561 |
| 6,225,584 B1 | * | 5/2001 | Ase et al. | ............. | 200/61.54 |
| 6,227,068 B1 | * | 5/2001 | Masui et al. | ............. | 74/473.3 |
| 6,677,544 B2 | * | 1/2004 | Ase et al. | ............. | 200/61.54 |
| 6,734,376 B2 | * | 5/2004 | Ichida et al. | ............. | 200/4 |
| 2002/0014565 A1 | | 2/2002 | Ase et al. | | |

FOREIGN PATENT DOCUMENTS

| | | |
|---|---|---|
| DE | 42 38 070 A1 | 5/1993 |
| GB | 1 201 726 A | 8/1970 |
| JP | 2004-196297 A | 7/2004 |

* cited by examiner

*Primary Examiner*—Michael A Friedhofer
(74) *Attorney, Agent, or Firm*—Arent Fox LLP (57) ABSTRACT

In a handle switch device of a vehicle, a switch casing which surrounds a bar handle and accommodates a switch in the inside thereof is mounted on the bar handle, and a manipulation knob which manipulate the switch is mounted on a rear wall of the switch casing. The manipulation knob is arranged substantially at the same height as the bar handle and is tiltably supported on the switch casing by way of a pivot shaft, the switch is formed of a slide-type switch in which a movable contact holder slides, the switch is arranged in the inside of the switch casing above or below the bar handle, and the manipulation knob and the movable contact holder are connected with each other by way of moving direction conversion means which converts a tilting of the manipulation knob to a linear movement and transmits the linear movement to the movable contact holder. Thus, it is possible to provide a handle switch device of a vehicle which exhibits favorable manipulability of a manipulation knob and has a compact shape.

7 Claims, 12 Drawing Sheets

(SWITCH OFF)

(SWITCH ON)

HANDLE SWITCH DEVICE OF VEHICLE

RELATED APPLICATION DATA

The present invention is based upon Japanese priority application No. 2006-101528, which is hereby incorporated in its entirety herein by reference.

BACKGROUND OF THE INVENTION

1. Field of the Invention

The present invention relates to an improvement of a handle switch device of a vehicle in which a handle grip is formed on an end portion of a bar handle for steering, a switch casing which surrounds the bar handle and accommodates a switch in the inside thereof is mounted on the bar handle adjacent to an inner end of the handle grip, and a manipulation knob which manipulate the switch is mounted on a rear wall of the switch casing on a rider side.

2. Description of the Related Art

Such a handle switch device of a vehicle has been already known as disclosed in Japanese Patent Application Laid-open No. 2004-196297.

In such a conventional handle switch device of a vehicle, a manipulation knob and switches manipulated by the manipulation knob are concentrated on one side of the bar handle. Accordingly, a switch casing which accommodates and supports these parts largely projects to the manipulation knob side thus impeding the realization of the device having a compact shape. Further, in the conventional handle switch device of a vehicle, the manipulation knob is integrally connected with a movable contact holder of the switch so that the manipulation knob is integrally slidable with the movable contact holder. Accordingly, a stroke ratio between the manipulation knob and the movable contact holder is 1 and the stroke ratio cannot be set to other value other than 1 and hence, the degree of freedom in design is limited.

SUMMARY OF THE INVENTION

The invention has been made under such circumstances and it is an object of the invention to provide a handle switch device of a vehicle which exhibits the favorable manipulability of a manipulation knob, has a compact shape, and is capable of freely setting a stroke ratio between the manipulation knob and a movable contact holder in design.

To achieve the above-mentioned object, according to a first feature of the invention, there is provided a handle switch device of a vehicle in which a handle grip is formed on an end portion of a bar handle for steering, a switch casing which surrounds the bar handle and accommodates a switch in the inside thereof is mounted on the bar handle adjacent to an inner end of the handle grip, and a manipulation knob which manipulate the switch is mounted on a rear wall of the switch casing on a rider side, wherein the first feature lies in that the manipulation knob is arranged substantially at the same height as the bar handle and is tiltably supported on the switch casing by way of a pivot shaft, the switch is formed of a slide-type switch in which a movable contact holder slides, the switch is arranged in the inside of the switch casing above or below the bar handle, and the manipulation knob and the movable contact holder are connected with each other by way of moving direction conversion means which converts a tilting of the manipulation knob to a linear movement and transmits the linear movement to the movable contact holder.

Further, according to a second feature of the invention, in addition to the first feature, the moving direction conversion means comprises a pin-shaped operation arm which is integrally formed on a tilting end of the manipulation knob and is arranged substantially parallel to the pivot shaft, and a fork-shaped follower arm which is integrally formed on the movable contact holder, is arranged in the direction approximately perpendicular to the pivot shaft, and is slidably engaged with the operation arm.

Further, according to a third feature of the invention, in addition to the first or second feature, the manipulation knob is arranged within a movable range of a thumb of a rider who grips the handle grip.

Further, according to a fourth feature of the invention, in addition to any one of the first to third features, the switch is a hazard switch which controls an operation of hazard lamps of the vehicle.

Further, according to a fifth feature of the invention, in addition to the fourth feature, on a fixed contact holder of the hazard switch, a pair of fixed contacts to which a pair of first hazard electricity supply paths respectively connected with a left hazard/blinker lamp and a right hazard/blinker lamp are individually connected are mounted, while on a movable contact holder, a common movable contact which is connected with a second hazard electricity supply path connected with a blinker relay and comes into contact with the fixed contacts at an ON position of the movable contact holder and is separated from the fixed contacts at an OFF position are mounted.

Further, according to a sixth feature of the invention, in addition to any one of the first to fifth features, the pivot shaft is integrally formed with a switch box of the switch.

Further, according to a seventh feature of the invention, in addition to any one of the first to sixth features, resilient repulsive means which always biases the manipulation knob to an inoperative position is arranged between the manipulation knob and the switch or the switch casing.

Further, according to an eighth feature of the invention, in addition to any one of the first to seventh features, the switch casing is mounted on the pair of left and right bar handles which are individually fixedly mounted on both left and right end portions of a top bridge of a manipulation front fork and has a front surface thereof covered with a front cowling.

With the first feature of the invention, the manipulation knob and the switch are arranged respectively in a dispersed manner such that the manipulation knob is arranged on a rear surface side of the bar handle and the switch is arranged on the side above or below the bar handle. Accordingly, these parts can be easily accommodated in a narrow space defined in the inside of the switch casing around the bar handle and hence, the switch casing can be formed in a compact shape, a sufficient pushing stroke of the manipulation knob can be ensured and, at the same time, the favorable manipulability of the manipulation knob can be ensured. Further, the manipulation knob is a tiltable-knob which is supported on the pivot shaft and hence, there is no sliding resistance thus allowing a rider to perform the pushing manipulation lightly.

Further, the switch which is arranged above or below the bar handle adopts the slidable movable contact holder. Since the movable contact holder is connected with the manipulation knob by way of the moving direction conversion means, it is possible to make the movable contact holder to slide lightly due to the tilting of the manipulation knob.

Further, the manipulation knob is a tiltable manipulation knob and hence, by selecting a distance between the pivot shaft and a connection point between the manipulation knob and the movable contact holder, a stroke ratio between the manipulation knob and the movable contact holder can be freely designed whereby the manipulation knob can cope with required data of various switches.

With the second feature of the invention, in tilting the manipulation knob around the pivot shaft, the operation arm can surely impart the linear movement to the movable contact holder by way of the follower arm, while sliding in the inside of a fork portion of the follower arm. Further, the moving direction conversion means has the extremely simple structure.

With the third feature of the invention, the rider can easily and properly manipulate the manipulation knob with his/her thumb while gripping the handle grip.

With the fourth feature of the invention, the hazard switch has a relatively large number of contacts and hence, when the movable contact holder is a slide type holder, the whole switch becomes inevitably elongated. However, even such a hazard switch can be accommodated in the inside of the switch casing in a compact manner avoiding the interference with the manipulation knob.

With the fifth feature of the invention, the pair of hazard electricity supply paths which are respective connected with the left hazard/blinker lamp and the right hazard/blinker lamp are provided independently from each other. Accordingly, when the hazard switch is in an OFF state, even when either one of left and right blinker lamps are operated, it is possible to prevent the supply of the electricity to the first hazard circuit from the blinker relay without using expensive backflow preventing means such as diode whereby a hazard circuit can be formed at a low cost.

With the sixth feature of the invention, due to the integral formation of the pivot shaft with the switch box, it is possible to achieve the reduction of the number of parts, and the simplification of the support structure such as means for preventing the removal of the pivot shaft. At the same time, the assembly of the manipulation knob and the switch can be constituted thus contributing to the enhancement of the assembling property.

With the seventh feature of the invention, since the manipulation knob is held at the inoperable position due to the resilient repulsive means, even when a play exists in the moving direction conversion means, the vibrations of the manipulation knob can be suppressed thus obviating the generation of vibration noises in advance.

With the eighth feature of the invention, the pair of left and right bar handles is individually fixedly mounted on both left and right end portions of the top bridge of the steering front fork and has front surfaces thereof covered with the front cowling. Accordingly, even the vehicle which has a little marginal space around the bar handle can enhance the manipulability of the bar handle and the switch due to the above-mentioned formation of the compact switch casing.

The above and other objects, features and advantages of the invention will become apparent from the following description of the preferred embodiment taken in conjunction with the accompanying drawings.

DESCRIPTION OF THE PREFERRED EMBODIMENT

Figure 1:
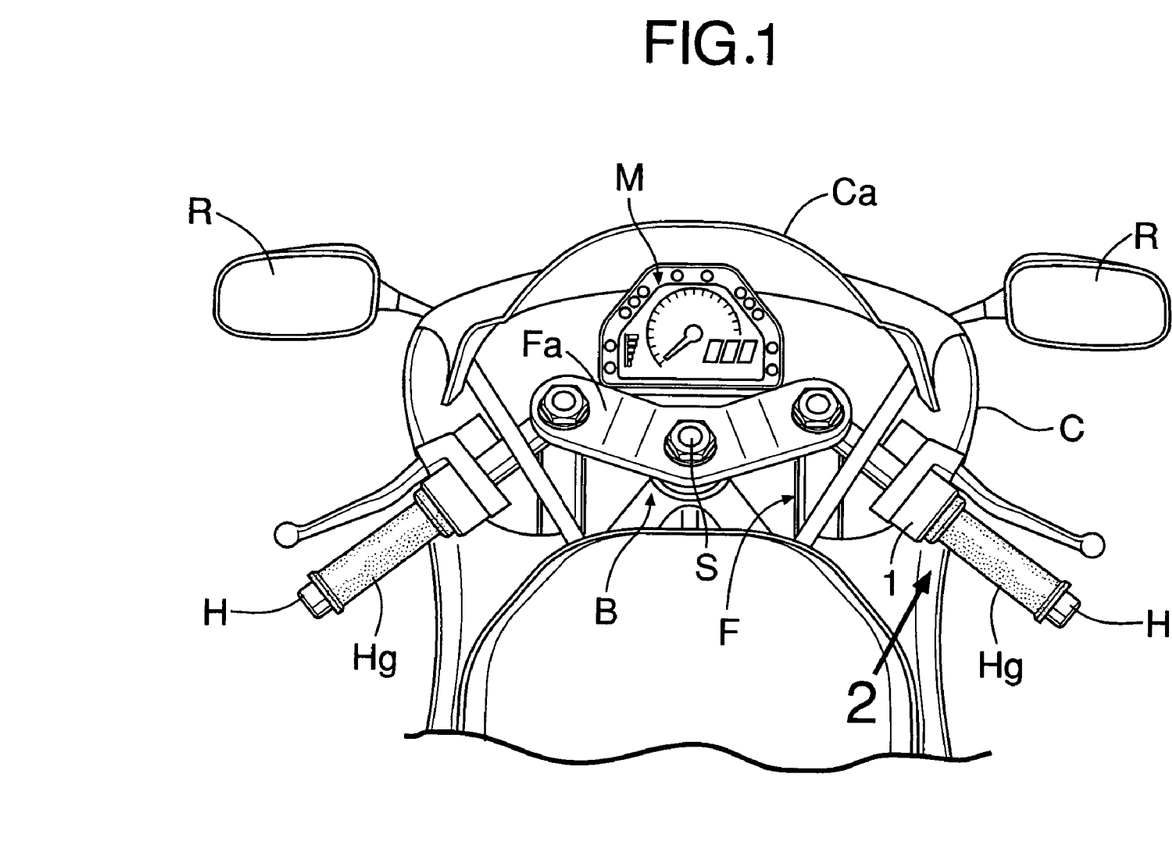
FIG. 1 is a plan view showing a periphery of a steering portion of a motorcycle which includes a handle switch device according to an embodiment of the invention.

First of all, in FIG. 1, on a front end portion of a vehicle body frame F of a sport-type motorcycle, a top bridge Fa and a lower bridge (not shown in drawings) of a front fork F for steering are connected in a rotatable manner by way of a steering stem S. The top bridge Fa has both left and right end portions thereof displaced frontwardly from a center portion thereof which is supported on the steering stem S thus forming an L shape in a plan view. Inner end portions of a pair of left and right bar handles H, H are respectively individually fixed to both end portions of the top bridge Fa, and handle grips Hg which are gripped by a rider are fitted and held on outer end portions of the bar handles H, H.

On the vehicle body frame F, a front cowling C which covers the front fork F including the top bridge Fa and the lower bridge from the front side is mounted. Further, to an upper end portion of the front cowling C, a windshield Ca which covers a meter unit M arranged right in front of the top bridge Fa from the front side is connected. Further, a pair of rearview mirrors R, R is mounted on left and right outer portions of the front cowling C.

Figure 2:
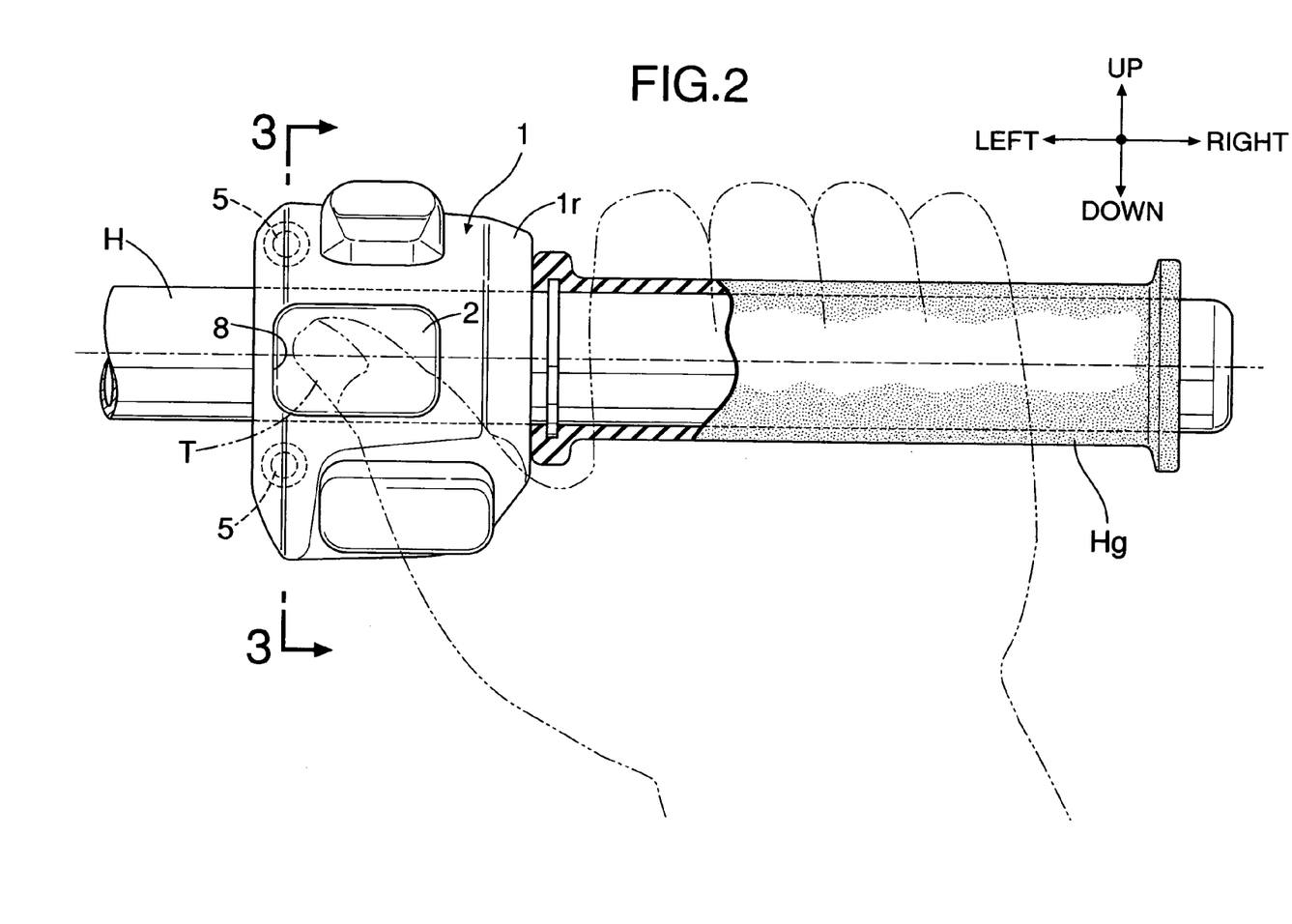
FIG. 2 is a view as viewed in the direction indicated by an arrow 2 in FIG. 1.

As shown in FIG. 2, on at least one bar handle H, a switch casing 1 which is arranged adjacent to an inner end of the handle grip Hg is mounted so that the switch casing 1 surrounds the bar handle H. Manipulation knobs of various switches are arranged on a rear wall of the switch casing 1 on a rider side. Particularly, on a center portion in the vertical direction of the switch casing 1, the manipulation knob 2 for hazard which is arranged within a movable range of a thumb T of a rider's hand which grips the handle grip Hg is mounted.

Figure 3:
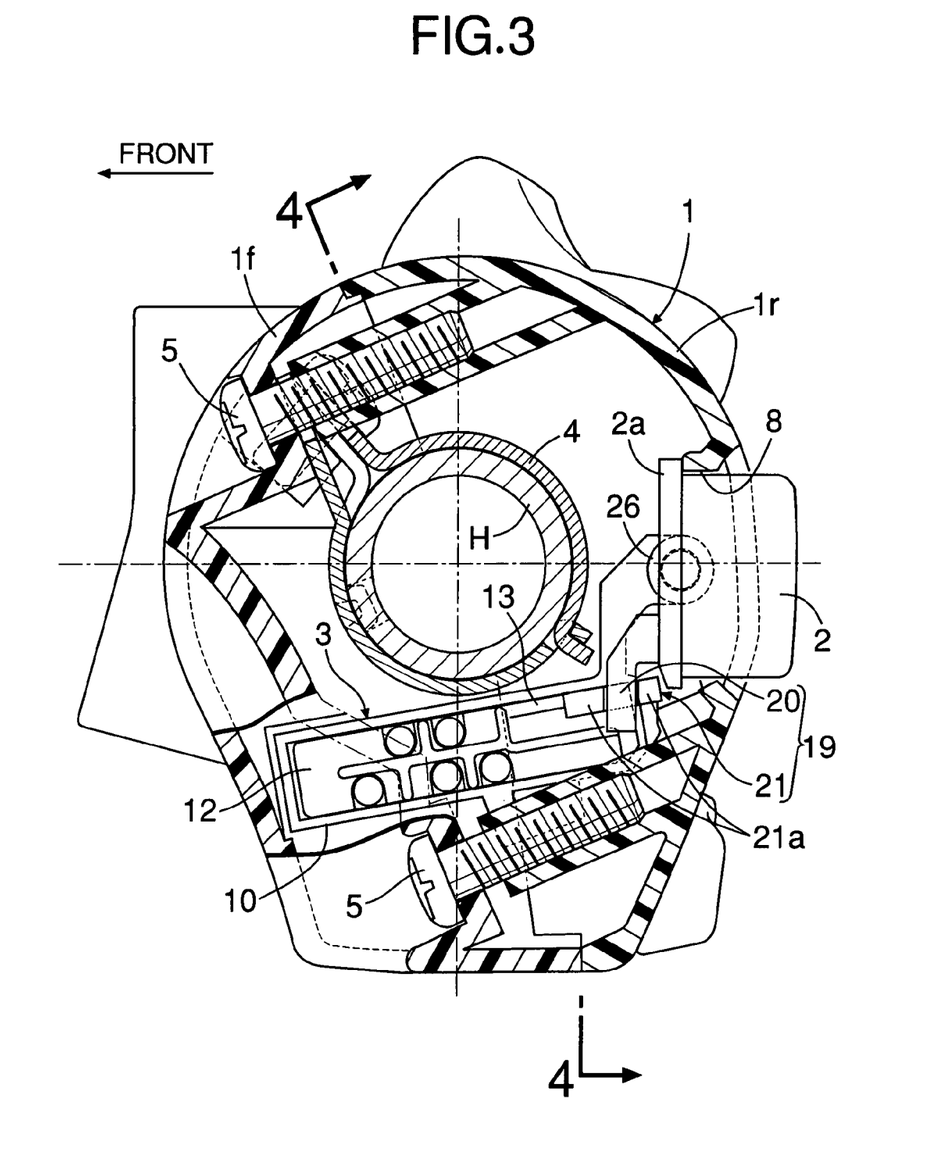
FIG. 3 is a cross-sectional view taken along a line 3-3 in FIG. 2.
Figure 4:
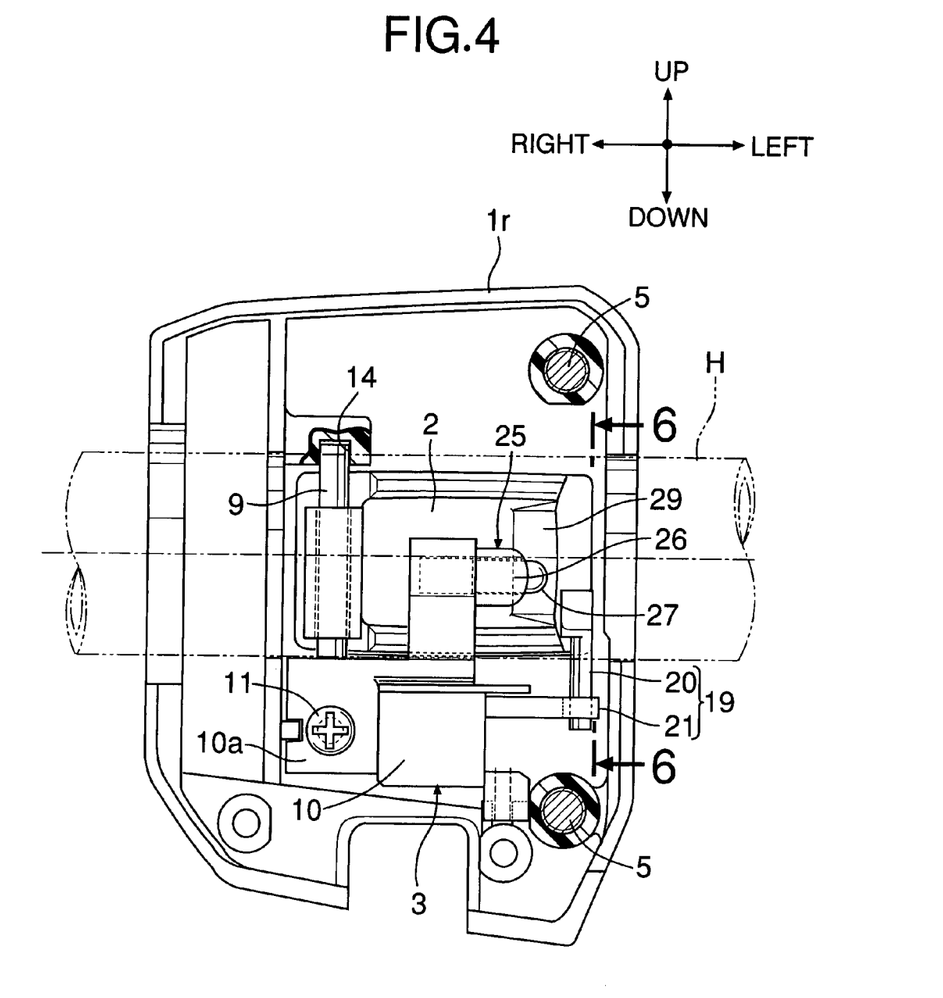
FIG. 4 is a cross-sectional view taken along a line 4-4 in FIG. 3.

The switch casing 1 is, as shown in FIG. 3 and FIG. 4, split into a front casing half body 1f and a rear casing half body 1r such that these casing half bodies 1r, 1f sandwich the bar handle H. On the rear casing half body 1r, the manipulation knob 2 for hazard, other various manipulation knobs, a hazard switch 3 and other various switches are mounted. Further, the front casing half body 1f is fixedly mounted on the bar handle H by way of a connecting fitting 4, and the rear casing half body 1r is joined to the front casing half body 1f using a plurality of screws 5.

Here, the above-mentioned manipulation knob 2 and hazard switch 3 which is manipulated by the manipulation knob 2 are explained in detail.

In FIG. 3 and FIG. 4, on the rear casing half body 1r, a knob mounting window 8 which faces to a rear surface (rider's side) of the bar handle H in an opposed manner. Further, a pivot shaft 9 which is arranged vertically adjacent to an end portion of the knob mounting window 8 on a handle grip Hg side is held on an inner wall of the rear casing half body 1*r*. The manipulation knob 2 which is tiltably supported on the pivot shaft 9 is mounted on the knob mounting window 8 from the inside of the rear casing half body 1*r*. In this manner, the manipulation knob 2 is arranged on a rear side of the bar handle H substantially at the same height as the bar handle H. The manipulation knob 2 has a portion thereof projected to the outside of the knob mounting window 8. A projecting quantity of the manipulation knob 2 is limited by bringing a flange 2*a* formed on a periphery of the manipulation knob 2 into contact with an inner surface of the rear casing half body 1*r* and hence, an inoperative position of the manipulation knob 2 is defined.

Figure 10:
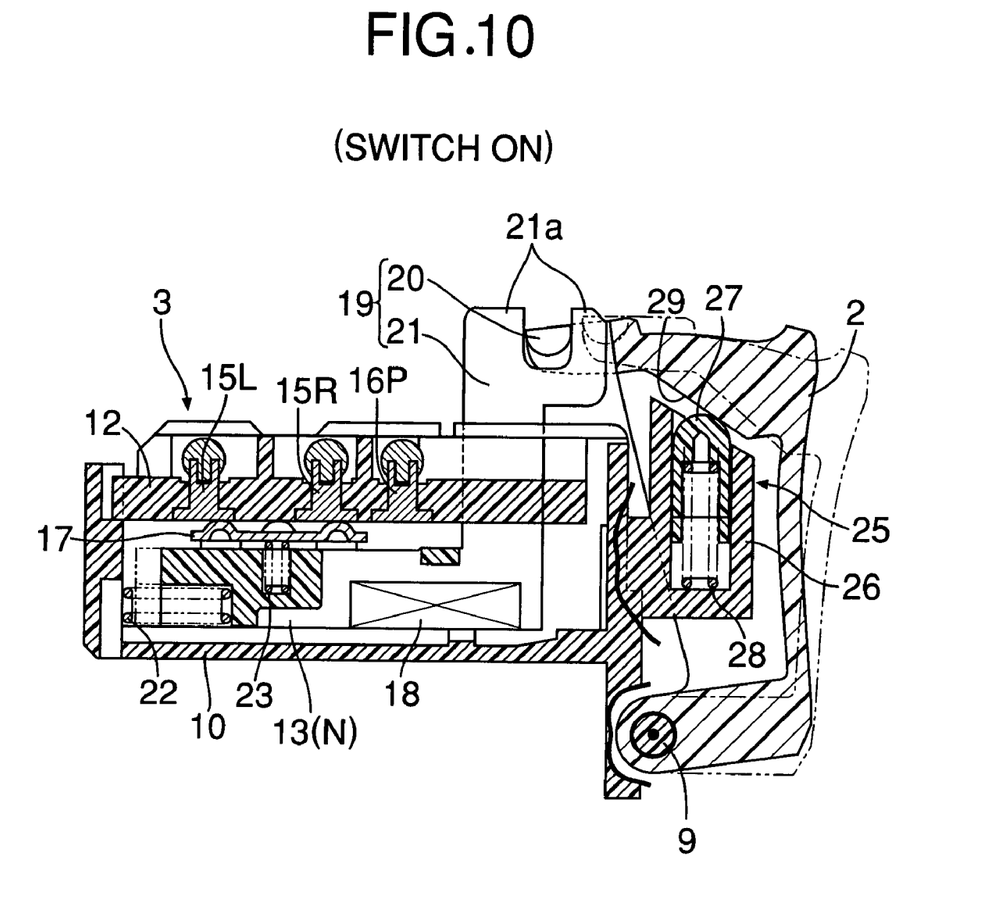
FIG. 10 is a view corresponding to FIG. 8 and showing an ON state of a hazard switch.

On the other hand, the hazard switch 3 is, as shown in FIG. 4 to FIG. 9, mounted on the inner wall of the rear casing half body 1*r* below the bar handle H. The hazard switch 3 is constituted of a rectangular-parallelepiped-shaped switch box 10 which is arranged below the bar handle H and extends in the longitudinal direction, a movable contact holder 13 which is accommodated in the switch box 10 in an slidable manner in the longitudinal direction of the switch box between an ON position N (see FIG. 10) and an OFF position F (see FIG. 8) and a fixed contact holder 12 which is fixed to an opening portion of the switch box 10 so as to cover the movable contact holder 13. The switch box 10 includes a stay 10*a* which is integrally formed therewith, and the stay 10*a* is fixedly mounted on the rear casing half body 1*r* using a screw 11.

The pivot shaft 9 is integrally formed with the stay 10*a* of the switch box 10 and an end portion of the pivot shaft 9 is fitted into and held by a support hole 14 (see FIG. 9) formed in the rear casing half body 1*r*. In this manner, by integrally forming the pivot shaft 9 with the switch box 10, it is possible to achieve not only the reduction of number of parts and the simplification of the supporting structure such as removal prevention structure of the pivot shaft 9 but also the enhancement of assembly property by constituting an assembled body formed of the manipulation knob 2 and the hazard switch 3.

Figure 5:
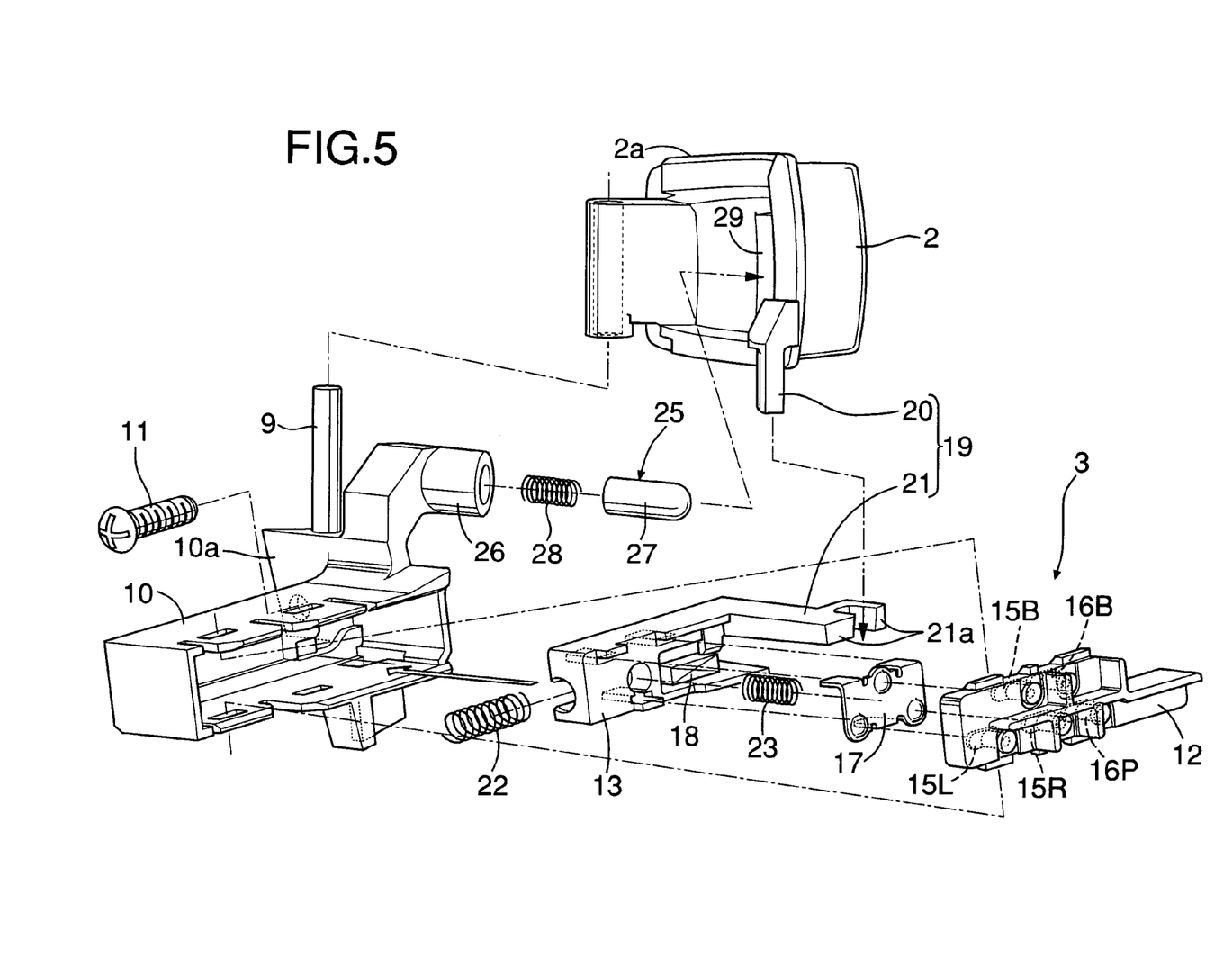
FIG. 5 is an exploded perspective view of an essential part of the handle switch device.
Figure 6:
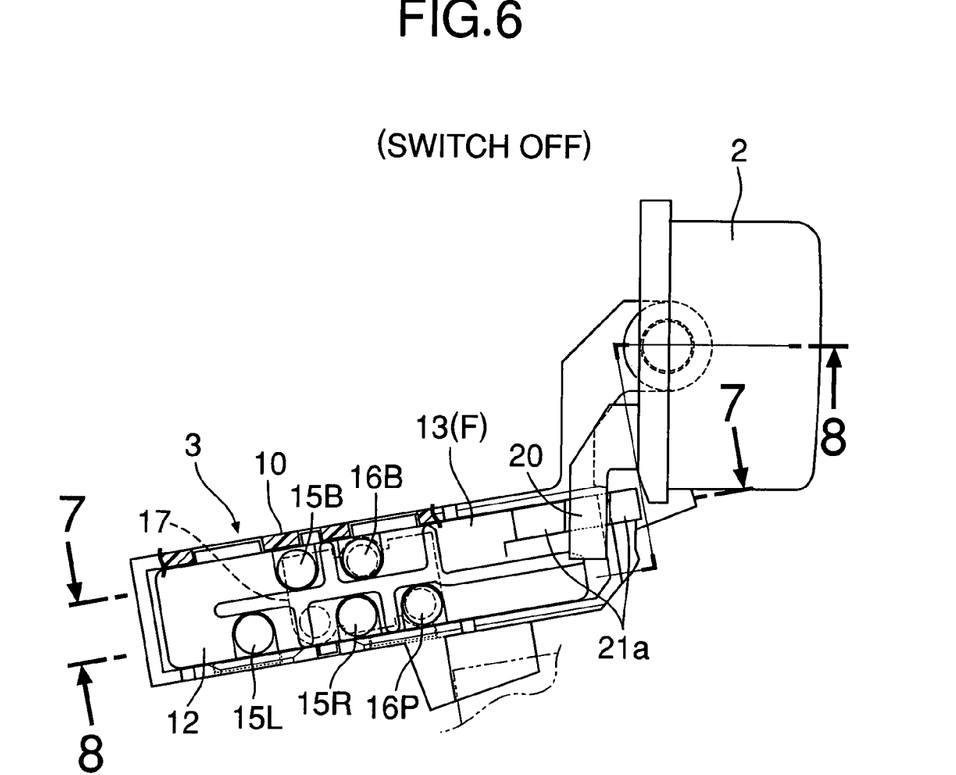
FIG. 6 is a cross-sectional view taken along a line 6-6 in FIG. 4.
Figure 7:
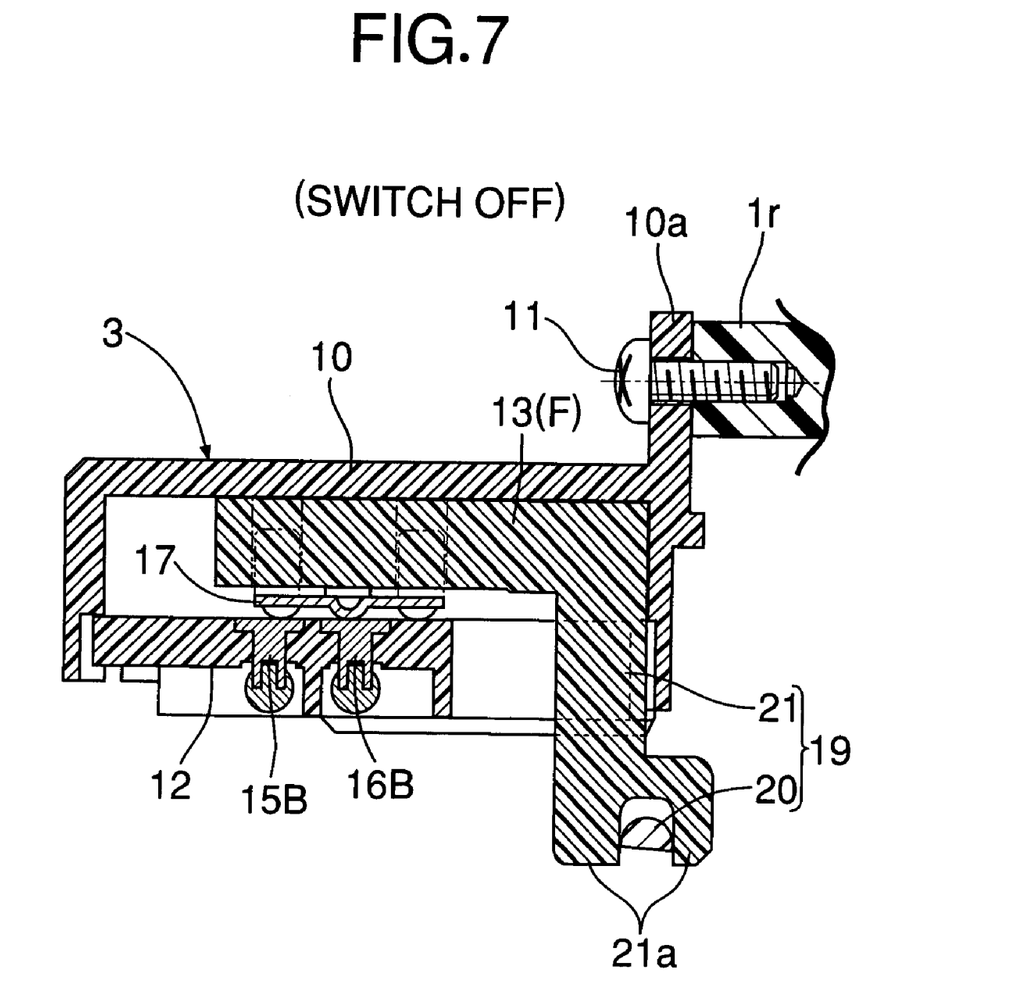
FIG. 7 is a cross-sectional view taken along a line 7-7 in FIG. 6.

As shown in FIG. 5 and FIG. 6, the fixed contact holder 12 holds one set of fixed contacts consisting of three first fixed contacts 15L, 15R and 15B which are arranged at peaks of a triangle and one set of fixed contacts consisting of two second fixed contacts 16B and 16P, while the movable contact holder 13 holds one common movable contact 17 which is capable of coming into contact with all of the first fixed contacts 15L, 15R and 15B due to a biasing force of a spring 23. By bringing the movable contact holder 13 into an ON position N, the movable contact 17 is brought into contact with only the first fixed contacts 15L, 15R and 15B and hence, the blinker lamp of the motorcycle is flickered as a hazard lamp, while by bringing the movable contact holder 13 into an OFF position F, the movable contact 17 is brought into contact with only the second fixed contacts 16B, 16P and hence, the position lamp is turned on. An electric circuit which enables such an operation is explained later.

As can be readily understood from FIG. 5 to FIG. 8, a return spring 22 which biases the movable contact holder 13 toward the OFF position F is accommodated in the switch box 10. Between the movable contact holder 13 and the switch box 10, there is provided a known intermittent locking mechanism 18 which holds the movable contact holder 13 at the ON position N even when the pushing force is released after the movable contact holder 13 is moved by pushing to the ON position N against the biasing force of the return spring 22 unless the pushing force is applied again to the movable contact holder 13.

The above-mentioned manipulation knob 2 and movable contact holder 13 are connected with each other by way of the moving direction conversion means 19 which converts the tilting of the manipulation knob 2 into the linear movement and transmits the linear movement to the movable contact holder 13. The moving direction conversion means 19 is constituted of a pin-shaped operation arm 20 which is integrally formed on a tilting end of the manipulation knob 2 and is arranged substantially parallel to the above-mentioned pivot shaft 9 in the inside of a rear casing half body 1*r*, and a fork-shaped follower arm 21 which is integrally formed on one end of the movable contact holder 13, projects to the outside of the switch box 10 after penetrating the fixed contact holder 12, and is arranged substantially perpendicular to the pivot shaft 9. The operation arm 20 is slidable engaged with the inside of the fork portion 21*a* of the follower arm 21. Accordingly, when the manipulation knob 2 is tilted about the pivot shaft 9, the operation arm 20 slides in the inside of the fork portion 21*a* and imparts the sliding, that is, the linear movement to the movable contact holder 13 by way of the follower arm 21 thus moving the movable contact holder 13 between the ON position N and the OFF position F.

Figure 8:
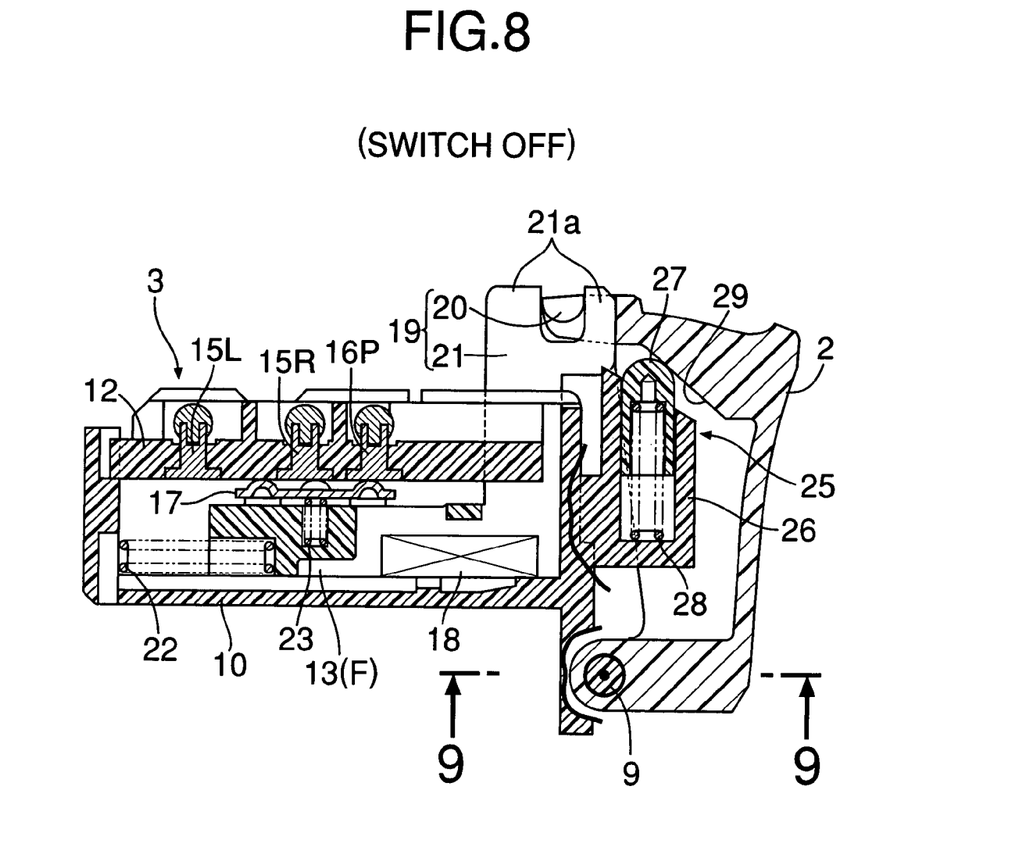
FIG. 8 is a cross-sectional view taken along a line 8-8 in FIG. 6.
Figure 9:
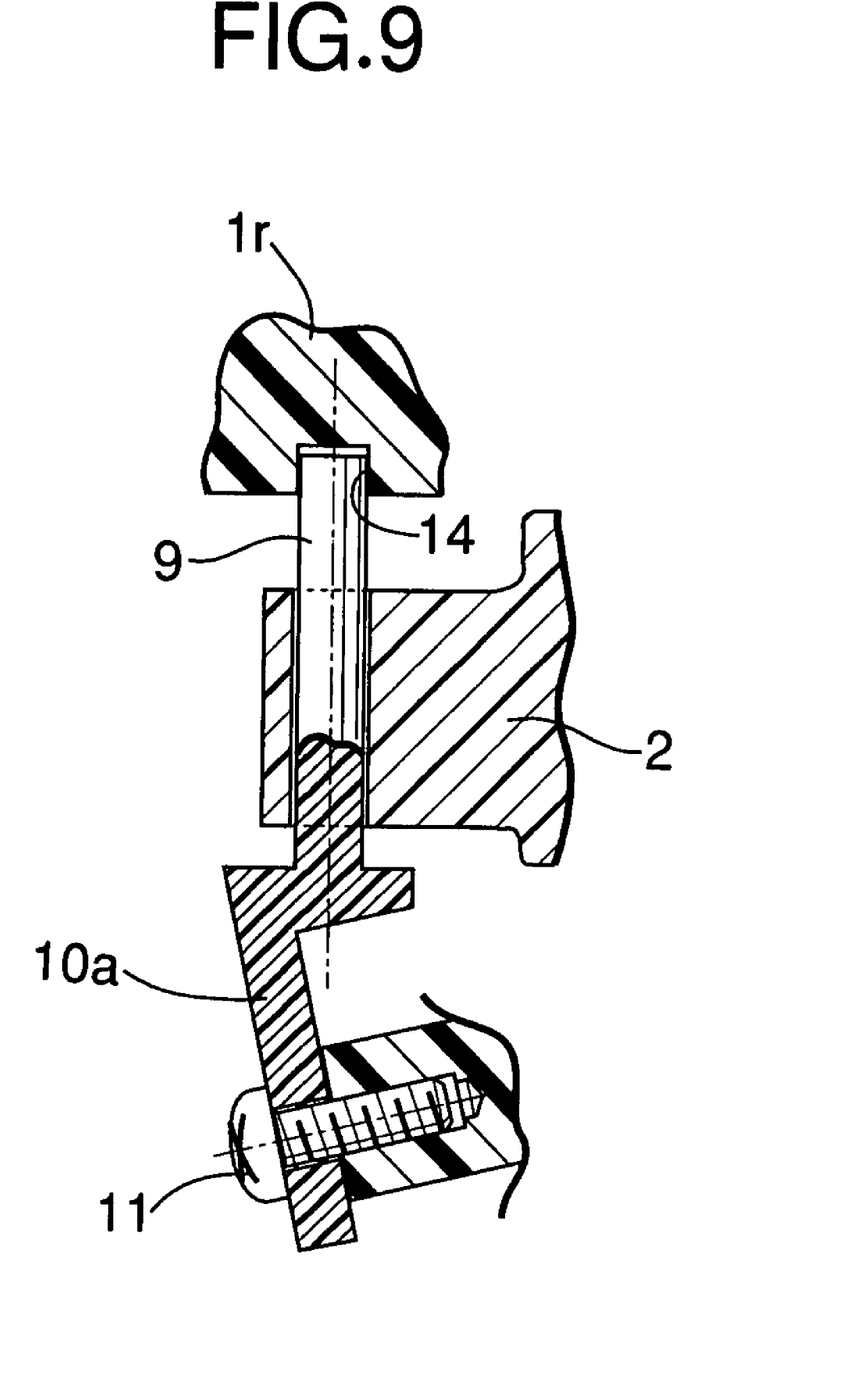
FIG. 9 is a cross-sectional view taken along a line 9-9 in FIG. 8.

In FIG. 4, FIG. 5 and FIG. 8, the manipulation knob 2 is formed in a box shape which opens toward the inside of the rear case half body 1*r*. In the inside of the manipulation knob 2, a resilient repulsive means 25 which biases the manipulation knob 2 to the inoperative position is provided. The resilient repulsive means 25 is constituted of a cylindrical guide sleeve 26 which is integrally formed with the switch box 10 and is arranged in the inside of the manipulation knob 2, a pusher pin 27 which is slidably inserted in the guide sleeve 26, a pusher spring 28 which biases the pusher pin 27 in the pin projecting direction toward the outside of the guide sleeve 26, and a slanted surface 29 which is formed on the inside of a tilting end portion of the manipulation knob 2 with which a semispherical end portion of the pusher pin 27 is brought into contact. The slanted surface 29 is inclined to approach the pivot shaft 9 in the direction away from the bar handle H along with the tilting direction of the manipulation knob 2.

When the pusher pin 27 pushes the slanted surface 29 due to the biasing force of the pusher spring 28, a component force which biases the manipulation knob 2 to the inoperative position is generated on a contact portion of the pusher pin 27 with the slanted surface 29, and the manipulation knob 2 is held at the inoperative position without a play. When the manipulation knob 2 is pushed from the outside, the slanted surface 29 pushes the pusher pin 27 into the inside of the guide sleeve 26 and hence, a manipulation load of the repulsive force manipulation knob 2 of the pusher spring 28 which is increased along with the pushing of the slanted surface 29 is determined (in an actual operation, the repulsive force of the return spring 22 in the inside of the switch box 10 is also added to the above-mentioned manipulation load). Accordingly, by selecting an angle of the slanted surface 29, a set load and a spring constant of the pusher spring 28, it is possible to adjust the manipulation feeling of the manipulation knob 2.

The description is made with respect to an operation of a hazard switch device which has the above-mentioned constitution.

When a rider of a motorcycle pushes the manipulation knob 2 with a thumb T of his/her hand which grips a handle grip Hg, the manipulation knob 2 is tilted forwardly about the pivot shaft 9 and the tilting of the manipulation knob 2 is converted into the linear movement by the moving direction conversion means 19, that is, by the operation arm 20 and the follower arm 21, and the linear movement is transmitted to the movable contact holder 13 of a hazard switch 3. Accordingly, the movable contact holder 13 is moved from an OFF position F to an ON position N (See FIG. 10) against a biasing force of the return spring 22, thus allowing a blinker lamp of the motorcycle to perform a blinking operation as a hazard lamp. Once the movable contact holder 13 is brought to the ON position N, the movable contact holder 13 is held at the ON position N due to an operation of the intermittent locking mechanism 18.

When the manipulation knob 2 is pushed by the thumb T again, the movable contact holder 13 is pushed again and hence, the intermittent locking mechanism 18 is released. When the pushing of the manipulation knob 2 is next released, the movable contact holder 13 returns to the OFF position F due to a biasing force of the return spring 22 and, at the same time, the manipulation knob 2 returns to an inoperative position due to the biasing forces of the return spring 22 and the pusher spring 28. Accordingly, the movable contact holder 13 returns to the OFF position F and the hazard lamp of the motorcycle can be turned off. In this state, the manipulation knob 2 is held at the inoperative position by the resilient repulsive means 25 including the pusher spring 28 and hence, even when a play exists at an engaging portion between the operation arm 20 and the fork portion 21a of the follower arm 21 of the moving direction conversion means 19, vibrations of the manipulation knob 2 can be suppressed, thus obviating the generation of vibration noises in advance.

Here, with respect to the switch casing 1 which is arranged to surround the bar handle H, the above-mentioned manipulation knob 2 is mounted on a rear wall of the switch casing 1 which faces a rear surface of the bar handle H. The manipulation knob 2 is also arranged within a movable range of the thumb T of the hand of the rider who grips the handle grip Hg. Accordingly, the rider can manipulate the manipulation knob 2 easily and accurately with the thumb T of his/her hand while gripping the hand grip Hg.

Further, since the manipulation knob 2 is tiltably supported on the pivot shaft 9 which extends vertically, the manipulation knob 2 receives no sliding resistance and can be lightly operated by pushing.

Further, by selecting a distance from a center of tilting of the manipulation knob 2, that is, the pivot shaft 9 to a connection point between the manipulation knob 2 and the movable contact holder 13, a stroke ratio between the manipulation knob 2 and the movable contact holder 13 can be freely set in design and hence, it is possible to cope with the required data of various kinds of switches.

On the other hand, the hazard switch 3 is arranged in the longitudinally extending manner away from the manipulation knob 2 in the inside of the switch casing 1 below the bar handle H. Accordingly, the hazard switch 3 can be easily accommodated in a small narrow space in the inside of the switch casing 1 below the bar handle H without interference of the manipulation knob 2 and hence, it is possible to form the switch casing 1 which surrounds the bar handle H in a compact shape and, at the same time, it is possible to ensure a sufficiently long pushing stroke of the manipulation knob 2 and also a sufficiently long sliding stroke of the movable contact holder 13.

Further, although the movable contact holder 13 of the hazard switch 3 is of a slide type and slidably supported on the switch box 10, the manipulation knob 2 is interlockingly connected to the movable contact holder 13 by way of the moving direction conversion means 19 and hence, it is possible to lightly slide the movable contact holder 13 due to the tilting of the manipulation knob 2.

Further, in a sport-type motorcycle, a pair of right and left bar handles H,H are individually fixedly mounted on the top bridge Fa which has a front face thereof covered with the front cowling C as described above and hence, only a small marginal space exists around the bar handle H. However, by mounting the handle switch device of the invention on the bar handle H, the manipulability of the bar handle H and the manipulation knob 2 can be enhanced due to the switch casing 1 formed in a compact shape.

Figure 11:
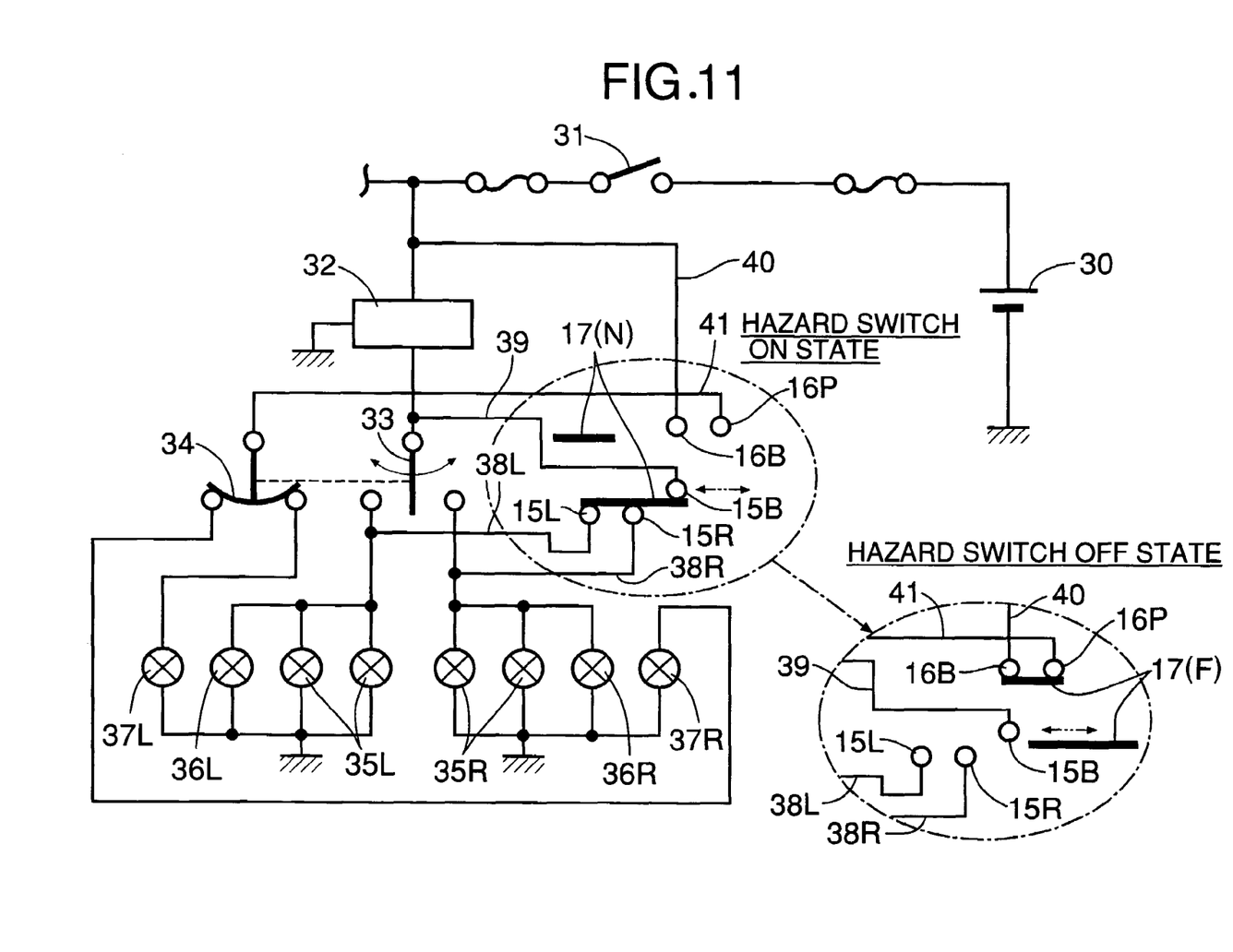
FIG. 11 is an electric circuit diagram for a blinker and a hazard switch which are controlled by the handle switch device.

Next, the description is made with respect to a blinker and a hazard-use electric circuit of the motorcycle which uses the above-mentioned hazard switch 3 of the invention in conjunction with FIG. 11.

Numeral 30 indicates a battery, numeral 31 indicates an ignition switch, numeral 32 indicates a blinker rely, numeral 33 indicates a blinker switch, numeral 34 indicates a changeover switch, numeral 35L indicates left-side front and rear hazard/blinker lamps, numeral 36L indicates a left blinker indicator lamp, numeral 37L indicates a left position lamp, numeral 35R indicates right-side front and rear hazard/blinker lamps, numeral 36R indicates right blinker indicator lamp, and numeral 37R indicates right position lamp. The above-mentioned changeover switch 34 is interlockingly operable with the blinker switch 33. That is, when the blinker switch 33 selects an operative position corresponding to either one of the left blinker lamp 35L and the right blinker lamp 35R, the above-mentioned changeover switch 34 automatically turns off either one of the position lamp 37L and 37R on the selected side.

First hazard electricity supply paths 38L, 38R leading to the left and right blinker lamps 35L, 35R are connected with two fixed contacts 15L, 15R out of three first fixed contacts 15L, 15R, 15B in the above-mentioned hazard switch 3, while the remaining one first fixed contact 15B is connected with a second hazard electricity supply path 39 which extends from between the blinker relay 32.and the blinker switch 33.

Further, an electricity supply path 40 which extends from a (+) side of the blinker relay 32 and an electricity supply path 41 which extends from a (+) side of the changeover switch 34 are respectively connected to the above-mentioned two second fixed contacts 16B, 16P.

Here, numeral 17 indicates a movable contact of the above-mentioned hazard switch 3. When the movable contact 17 is brought into contact with only the above-mentioned three first fixed contacts 15L, 15R and 15B due to the movement of the movable contact holder 13 to the ON position, the electricity is intermittently supplied to both of left and right blinker lamps 35L, 35R from the battery 30 through the blinker relay 32 and the movable contact 17 and these blinker lamps 35L, 35R are flickered as hazard lamps.

Further, when the movable contact holder 13 returns to the OFF position F and the movable contact 17 is brought into contact with only the above-mentioned second fixed contacts 16B, 16P, the electricity is supplied to left and right position lamps 37L, 37R from the battery 30 through the movable contact 17 and hence, these position lamps 37L, 37R are turned on. In this manner, when the blinker switch 33 is manipulated to the left or the right with the hazard switch 3 in the OFF state, the electricity is intermittently supplied to the left blinker lamp 35L or the right blinker lamp 35R from the blinker relay 32. Here, as mentioned previously, since two first fixed contacts 15L, 15R of the hazard switch 3 are independently connected to the pair of first hazard electricity supply paths 38L, 38R which are connected with the left and right blinker lamps 35L, 35R, when the electricity is supplied to the one-side blinker lamp 35L or 35R, it is possible to simply interrupt the supply of electricity to another-side blinker lamp 35R or 35L through the first hazard electricity supply paths 38L, 38R.

Figure 12:
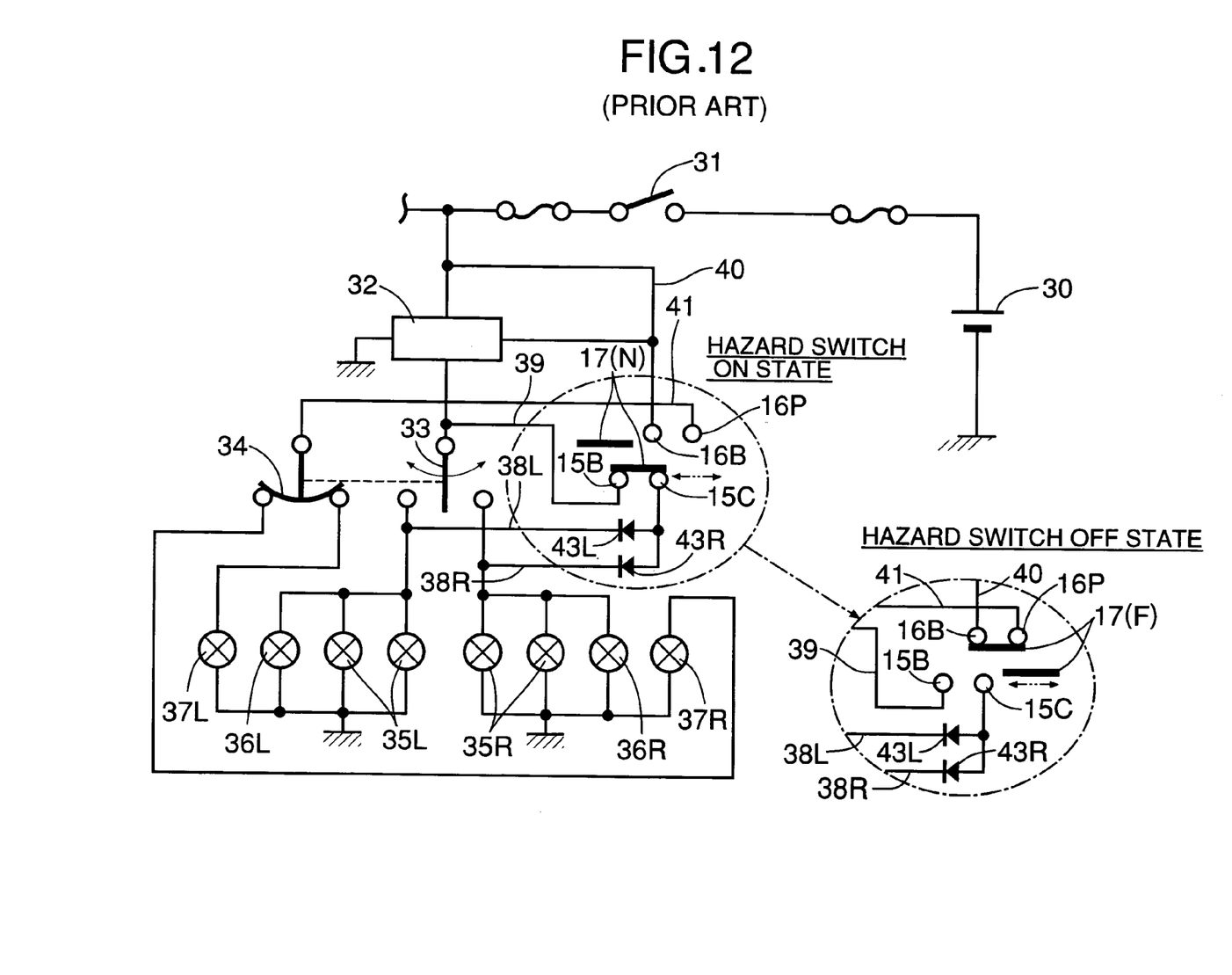
FIG. 12 is a view corresponding to FIG. 11 and showing a conventional electric circuit for a blinker and a hazard switch.

To the contrary, in the conventional electric circuit, as shown in FIG. 12, the first hazard electricity supply paths 38L, 38R are connected to one common first fixed contact 15C and hence, when the electricity is supplied to one-side blinker lamp 35L or 35R, to prevent the supply of the electricity to another-side blinker lamp 35R or 35L through the first hazard electricity supply paths 38L, 38R, diodes 43L, 43R for preventing a reverse flow are respectively inserted in the first hazard electricity supply paths 38L, 38R.

As can be readily understood from the above, the electric circuit which uses the hazard switch 3 of the invention can prevent the supply of electricity to the above-mentioned another-side blinker lamp using only three first fixed contacts 15L, 15R, 15B without using expensive diodes 43L, 43R and hence, the invention can contribute to the simplification of the circuit constitution and eventually the reduction of cost.

Further, in the above-mentioned hazard switch 3, due to the provision of three first fixed contacts 15L, 15R, 15B, it is necessary to elongate the slide stroke of the movable contact holder 13 compared to a conventional hazard switch. However, as mentioned previously, the hazard switch 3 is separated from the manipulation knob 2 and is arranged in the longitudinal direction in the inside of the switch casing 1 below the bar handle H and hence, it is possible to ensure the sufficiently long slide stroke of the movable contact holder 13 without particularly large-sizing the switch casing 1.

The invention is not limited to the above-mentioned embodiment, and various modifications in design are conceivable without departing from the subject mater of the invention. For example, it is possible to obtain advantageous effects substantially equal to the advantageous effects of the above-mentioned embodiment by arranging the hazard switch 3 in the inside of the switch casing 1 above the bar handle H. Further, the invention is also applicable to switches for other usages without being limited to the hazard switch 3.

What is claimed is:

1. A handle switch device of a vehicle in which a handle grip is formed on an end portion of a bar handle for steering, a switch casing which surrounds the bar handle and accommodates a switch in the inside thereof is mounted on the bar handle adjacent to an inner end of the handle grip, and a manipulation knob, which manipulates the switch, is mounted on a rear wall of the switch casing on a rider side, wherein the manipulation knob is arranged substantially at a same height as the bar handle and is tiltably supported on the switch casing by way of a pivot shaft that is integrally formed with a switch box of the switch and is parallel with a longitudinal direction of the manipulation knob, the switch is formed of a slide-type switch in which a movable contact holder slides with the operation of the manipulation knob, the switch is arranged in the inside of the switch casing above or below the bar handle, and the manipulation knob and the movable contact holder are connected with each other by way of moving direction conversion means for converting a tilting of the manipulation knob to a linear movement and transmitting the linear movement to the movable contact holder.

2. A handle switch device of a vehicle according to claim 1, wherein the moving direction conversion means comprises a pin-shaped operation arm, which is integrally formed on a tilting end of the manipulation knob, is arranged substantially parallel to the pivot shaft, and a fork-shaped follower arm, which is integrally formed on the movable contact holder, is arranged in the direction approximately perpendicular to the pivot shaft, and is slidably engaged with the operation arm.

3. A handle switch device of a vehicle according to claim 1, wherein the manipulation knob is arranged within a movable range of a thumb of a rider who grips the handle grip.

4. A handle switch device of a vehicle according to claim 1, wherein the switch is a hazard switch that controls an operation of hazard lamps of the vehicle.

5. A handle switch device of a vehicle according to claim 4, wherein, the hazard switch comprises a fixed contact holder and the movable contact holder, a pair of fixed contacts, to which a pair of first hazard electricity supply paths respectively connected with a left hazard/blinker lamp and a right hazard/blinker lamp are individually connected, are mounted on the fixed contact holder, and a common movable contact is included in the movable contact holder, the common movable contact is connected with a second hazard electricity supply path connected with a blinder relay that comes into contact with the fixed contacts at an ON position of the movable contact holder and is separated from the fixed contacts at an OFF position.

6. A handle switch device of a vehicle according to claim 1, further comprising a resilient repulsive means that biases the manipulation knob to an inoperative position at all times is arranged between the manipulation knob and the switch or the switch casing.

7. A handle switch device of a vehicle according to claim 1, comprising two switch casings, wherein the switch casings are mounted on a pair of left and right bar handles, which are individually fixedly mounted on both left and right end portions of a top bridge of a manipulation front fork and each has a front surface covered with a front cowling.

* * * * *